United States Patent Office 3,410,877
Patented Nov. 12, 1968

3,410,877
PROCESS FOR THE PREPARATION OF 2,3-DI-CHLORO-5,6-DICYANOBENZOQUINONE
Derek Walker, Boulder, Colo., assignor, by mesne assignments, to Syntex Corporation, Panama, Panama, a corporation of Panama
No Drawing. Filed Jan. 8, 1964, Ser. No. 336,598
18 Claims. (Cl. 260—396)

The present invention is concerned with a novel process for the preparation of dichlorodicyanoquinone compounds. The invention is more particularly directed to a process for the preparation of 2,3-dichloro-5,6-dicyanobenzoquinone.

2,3-dichloro-5,6-dicyanobenzoquinone is a bright yellow to orange solid soluble in methylene dichloride, acetic acid, benzene and the like. It is substantially insoluble in water but reacts slowly therewith releasing hydrogen cyanide.

2,3-dichloro-5,6-dicyanobenzoquinone is useful as an oxidizing agent and more particularly as a dehydrogenating agent. Thus, for example, it can react with tetralin to produce naphthalene substantially quantitatively. It has found particular utility as an agent for selective dehydrogenation, such as for example, in producing unsaturation at particular positions in steroid molecules. The agent has heretofore been prepared from 2,3-dicyanohydroquinone only by multistep procedures which have been time-consuming, have used relatively expensive reagents, or which have been unsatisfactory for producing good yields. Moreover, the known processes have employed substantially anhydrous organic solvents with the view of avoiding the characteristic destruction of 2,3-dichloro-5,6-dicyanobenzoquinone by water.

According to the present invention, it has been discovered that high yields of the desired 2,3-dichloro-5,6-dicyanobenzoquinone may be obtained from 2,3-dicyanohydroquinone not only in aqueous medium but in a simple, single-step process. It has now been found, quite unexpectedly, that 2,3-dichloro-5,6-dicyanobenzoquinone is readily obtained when 2,3-dicyanohydroquinone is contacted with chloride ion and an oxidizing agent in an aqueous medium which is acidic in character and caused to react therein.

The present invention permits for the first time the use of a cheap and convenient reaction medium, namely water. The present process provides for a single step process. The present invention further provides a process furnishing high yields of the desired product. In addition, the present process is readily adaptable to large scale operations.

In carrying out the reaction, the exact amounts of the reactants is not critical but certain limitations must be met in order to obtain the high yields contemplated by the present invention. With respect to 2,3-dicyanohydroquinone, at least a stoichiometric amount of oxidizing agent is required, although such amount need not be introduced initially as will become apparent from the disclosure following hereinafter. Generally, from three to ten equivalents of oxidizing agent per equivalent of 2,3-dicyanohydroquinone may be employed. The chloride ion, for best results, must be present in molar excess, at least 3 times the molar amount or 1.5 times the stoichiometric requirement of the 2,3-dicyanohydroquinone. Generally, from about 4 to 25 moles per mole of 2,3-dicyanohydroquinone is preferred. It is essential that the acid medium be of sufficient acid strength; an acid strength of at least 0.5 normal is deemed necessary. The practical upper limit is about 20 normal. The most convenient range of acid strength appears to be from about 2 normal to about 12 normal when considerations of optimum yields and adaptability to large scale handling are made.

Suitable acids for providing the acid requirement above set forth include hydrochloric acid, nitric acid, sulfuric acid, hydrobromic acid, bromic acid, phosphoric acid, methane sulfonic acid, toluene sulfonic acid, etc.

The chloride ion may be supplied by any convenient chloride source. Suitable sources include hydrochloric acid, ammonium chloride, metal chlorides such as sodium chloride, lithium chloride, potassium chloride, magnesium chloride, calcium chloride, etc.

The requirements for two of the components may be met with one reagent. For example, hydrochloric acid is an economical and convenient source of the essential chloride ion and the required acidity. Thus, in one method for carryng out the reaction, 2,3-dicyanohydroquinone is slurried in hydrochloric acid. However, any combination of acids and chlorides may be employed, such as sodium chloride and nitric acid (nitric acid can also serve as oxidant), potassium chloride and sulfuric acid, lithium chloride and hydrobromic acid, lithium chloride and bromic acid (bromic acid can also serve as oxidant), ammonium chloride and phosphoric acid, etc. The particular combination which may be suitable or convenient is readily determined by those skilled in the art.

Suitable oxidizing agents are the conventional oxidizing agents and include nitric acid, dinitrogen tetroxide, nitrogen dioxide, mixtures of nitrogen oxide gases, manganese dioxide, lead dioxide, nitrates, bromates, dichromates, permanganates, combinations of reagents which produce oxidizing agents, e.g., nitric oxide-air or nitric oxide-oxygen, or combination thereof. The suitable nitrate, bromate, permanganate, dichromate, etc. oxidizing agents include not only the acid forms but also salts such as ammonium, potassium, lithium, sodium, magnesium, calcium, etc.

The preferred oxidizing agents are nitrogen oxide oxidizing agents, primarily for economic and utilitarian reasons. The expression "nitrogen oxide oxidizing agents" as here-in employed is inclusive of nitric acid, nitrogen dioxide, dinitrogen tetroxide, mixtures of nitrogen oxides and water solutions thereof. The expression is intended to include suitable combinations of reagents which are capable of producing the foregoing. Thus, a mixture of nitric oxide and oxygen or air which form a mixture of nitrogen dioxide and dinitrogen tetroxide is suitable for employment as oxidizing agent. A practical application of the suitability of the mixture of nitric oxide and air or oxygen is in a process wherein a minor amount of nitric acid, nitrogen dioxide-dinitrogen tetroxide or mixtures thereof is initially introduced into the reaction mixture, permitting the reaction to initiate with the formation of nitric oxide by-product, thereafter oxidizing the nitric oxide, either in situ or in a separate reactor, to nitrogen dioxide, dinitrogen tetroxide gases which are then employed to continue the oxidation with the formation of nitric oxide and the cycle repeated until the reaction is completed. Alternatively, nitric oxide and air or oxygen may be introduced into the reactor initially, whereupon the mixture is converted to a mixture of nitrogen dioxide-dinitrogen tetroxide which initiates the oxidation reaction and thereafter introducing oxygen to continuously oxidize the nitric oxide gas by-product as it is formed in the reaction until the reaction is completed.

The diluent or reaction medium for the process of the present invention is water. However, by "aqueous medium" is meant that water may be modified by adding to the water organic solvents resistant to oxidizing agents. Suitable organic solvents include acetic acid, halohydrocarbons such as methylene dichloride, carbon tetrachloride, chloroform, etc., benzene, halogenated benzenes and the like. The organic solvent, if employed, may be added at the start of the reaction or at any time during the course of the reaction. It may be added together with a minor amount of oxidizing agent in a finishing operation to insure good quality of product.

Although some of the desired 2,3-dichloro-5,6-dicyanobenzoquinone product may be obtained by mixing together the reactants in any order, it is critical and essential for the obtention of good yields that the 2,3-dicyanohydroquinone reactant not be brought into contact with oxidizing agent in the absence of chloride ion, i.e., a mixture of chloride ion and oxidizing agent may be simultaneously contacted in acid medium with 2,3-dicyanohydroquinone or a mixture of the chloride ion and 2,3-dicyanohydroquinone may be simultaneously contacted in acid medium with the oxidizing agent. In the preferred method, the oxidizing agent is brought into contact with an aqueous acidic mixture of 2,3-dicyanohydroquinone and chloride ion. Conveniently, an oxidizing agent is intimately contacted and stirred with an aqueous hydrochloric acid slurry of 2,3-dicyanohydroquinone.

The reaction may be carried out at temperatures ranging from about 0° C. to about 100° C. Preferred methods include carrying out the reaction at temperatures of from about room temperature to about 50° C. The reaction may be carried out in from about one-half hour to about six hours, the optimum time being dependent upon efficiency of stirring, size of preparation, temperature, etc.

In one method for preparing 2,3-dichloro-5,6-dicyanobenzoquinone, 2,3 - dicyanohydroquinone in aqueous or acidic medium is brought into simultaneous contact with a mixture of an oxidizing agent and chloride ion in an aqueous acidic medium. In carrying out this reaction, 2,3-dicyanohydroquinone reactant, in acid or water, is added to and thoroughly mixed with a mixture of oxidizing agent and chloride ion producing agent in aqueous acidic medium at a temperature of from about 20° to about 25° C. and the reaction allowed to take place over a period of from 0.5 to several hours. Thereafter, there may be added a minor amount of oxidizing agent and the mixture maintained in the temperature range of from about 30° C. to about 50° C. for a few hours to insure completion of formation of the desired 2,3-dichloro-5,6-dicyanobenzoquinone product which precipitates in the reaction mixture. The mixture is then cooled to about 5° C. to complete the precipitation of the product which is thereafter recovered by filtration or centrifugation and which may be purified, if desired, by recrystallization from oxidation resistant solvents such as methylene dichloride, benzene, acetic acid or the like.

In another method for preparing 2,3-dichloro-5,6-dicyanobenzoquinone, a mixture of 2,3-dicyanohydroquinone and chloride ion producing agent in acid solution is contacted with and thoroughly mixed with an oxidizing agent in the temperature range of from about 20° to about 25° C. over a period of from about 0.5 to several hours. Thereafter, an additional amount of oxidizing agent may be added and the mixture maintained in the temperature range of from about 30° to about 50° C. for 0.5 to several hours to insure completion of the reaction. The mixture is then cooled to from about 0° C. to about 25° C. to complete the precipitation of the desired solid 2,3-dichloro-5,6-dicyanobenzoquinone product. The latter is recovered by filtration or centrifugation and may be purified, if desired, by recrystallization as hereinabove indicated.

In a preferred method for carrying out the reaction, a slurry of 2,3-dicyanohydroquinone in hydrochloric acid is contacted and thoroughly mixed with a small amount of nitric acid in the temperature range of from about 20° to about 25° C. in a closed vessel and oxygen thereafter fed into the vessel until no further reaction takes place as determined by the cessation of the uptake of oxygen. Thereafter, a small amount of nitric acid may be added, with or without inert diluent and the mixture warmed to from about 30° to about 50° C. for from one to two hours in a finishing operation to insure the completion of the reaction and the formation of the desired 2,3-dichloro-5,6-benzoquinone product. The latter may be recovered from the reaction mixture by filtration or centrifugation and purified, if desired, in the manner previously described.

In the foregoing operation, the minor amount of nitric acid initially added is consumed in partial oxidation of the 2,3-dicyanohydroquinone with the formation of nitric oxide by-product which is oxidized by the oxygen fed into the reactor to form nitrogen dioxide-dinitrogen tetroxide gases which then continue the oxidation of the 2,3-dicyanohydroquinone. The amount of nitric acid initially added is preferably from about 5 to 25 percent of the stoichiometric amount required in the oxidation. Alternatively, a minor amount of one of the oxides of nitrogen having oxidizing capacity may be introduced initially into the reactor, with or without concomitant introduction of oxygen. Once initiated, the reaction is maintained by the continual addition of oxygen to oxidize the nitric oxide by-product as above described. The final addition of the extra small amount of nitric acid and slight elevation of the reaction temperature is not essential to the reaction but is deemed desirable to insure optimum yields.

The following examples illustrate the invention but are not to be construed as limiting:

Example 1

21 milliliters of concentrated nitric acid (0.32 mole) was added over a 60 minute period to a suspension of 16 grams (0.10 mole) of 2,3-dicyanohydroquinone in 200 milliliters of a 1:1 mixture of concentrated hydrochloric acid (1.1 moles) and water which had been warmed to 50° C. After completion of the addition of nitric acid, the resulting mixture was stirred in the temperature range of from about 20° to 30° C. for about 30 minutes to obtain 2,3-dichloro-5,6-dicyanobenzoquinone product. The reaction mixture was cooled to 5° C. to complete the precipitation of the product and the mixture filtered to recover the product which was then washed first with 5 percent hydrochloric acid and then with carbon tetrachloride and dried. The product was obtained as a yellow solid in a yield of 17.1 grams. The product, after purification with activated carbon and recrystallization from methylene dichloride had a melting point of 211°–212° C.

Example 2

5.5 milliliters (8.2 grams, 0.18 mole) of a nitrogen dioxidedinitrogen tetroxide mixture was added in 0.5 milliliter aliquots over a period of about one hour to a suspension of 5 grams (0.3 mole) of 2,3-dicyanohydroquinone in 70 milliliters of a 1:1 concentrated hydrochloric acid-water mixture (0.42 mole of HCl) while the temperature was maintained in the range of from about 30° to 35° C. After completion of the addition, the reaction mixture was stirred for about 1.5 hours while the temperature was maintained at about 30° to obtain a 2,3-dichloro-5,6-dicyanobenzoquinone product. The product was recovered by filtration, washed with carbon tetrachloride and dried. The yield of the product which melted from 207° to 210° C. was about 5.5 grams or about 78 percent of theory.

Example 3

A solution of 10.9 grams (0.72 mole) of sodium bromate in 50 milliliters of water was added slowly over a period of about one hour to a suspension of 8 grams (0.05 mole) of 2,3-dicyanohydroquinone in an aqueous mixture of 80 milliliters (0.96 mole) of concentrated hydrochloric acid and 30 milliliters of water while the temperature during the addition was maintained by cooling from about 35° to about 40° C. After completion of the addition, the reaction mixture was stirred for about 2 hours while the temperature of the reaction mixture cooled from about 35° to about 26° C. with completion of the formation of a 2,3-dichloro-5,6-dicyanobenzoquinone product. The latter was recovered by filtration and purified by washing with ice cold 1:1 aqueous hydrochloric acid and with carbon tetrachloride. The yield of the product thus recovered was 7.0 grams or 61.5 percent of theoretical. The product melted from 214.5° to 216° C.

Example 4

16 grams (0.1 mole) of 2,3-dicyanohydroquinone was suspended in 40 milliliters (0.48 mole) of concentrated hydrochloric acid and 40 milliliters of water. One-fourth of the slurry thus prepared was added to a solution of 7.35 grams (0.025 mole) of potassium dichromate in 75 milliliters of concentrated hydrochloric acid and 75 milliliters of water. The resulting mixture was stirred for about 10 minutes and then an additional amount of dichromate solution of the same concentration and an additional one-fourth portion of the dicyanohydroquinone slurry was added and the resulting mixture stirred for about ten minutes. The process was repeated twice more, the stirring after the final addition being carried out for one hour. The temperature of the reaction mixture was kept in the range of from 30° to 40° C. throughout the reaction. As the result of these operations, a reaction took place with the formation of the desired 2,3-dichloro-5,6-dicyanobenzoquinone product. The reaction mixture was cooled to 25° C. and kept there for one-half hour to complete the precipitation of the product which was thereafter recovered by filtration. The product was washed with 1:1 aqueous hydrochloric acid and dried to obtain a yellow solid in a yield of 18.9 grams or 83.8 percent of theory. The product melted from 203.5°–212° C. and gave no melting point depression with a standard 2,3-dichloro-5,6-dicyanobenzoquinone sample melting from 211° to 214° C.

Example 5

A solution of 6.9 grams (0.05 mole) of sodium bromate in 25 milliliters of water was added with stirring over a period of about 20 minutes to a slurry of 10 grams (0.062 mole) of 2,3-dicyanohydroquinone in 100 milliliters (1.1 moles) of concentrated hydrochloric acid and 75 milliliters of water while the temperature was maintained in the range of from about 35° to about 40° C. The reaction mixture was stirred an additional one-half hour and thereafter, 9 milliliters (0.14 mole) of concentrated nitric acid was added over a period of about fifteen minutes. After completion of the addition, the reaction mixture was stirred for about one hour to obtain the desired 2,3-dichloro-5,6-dicyanobenzoquinone product as a precipitate. The latter was recovered by filtration, washed with 1:1 aqueous hydrochloric acid and dried. The yield of the product was 10.8 grams or 76 percent of theory. The product melted from 208° to 212° C.

Example 6

6.6 milliliters (0.1 mole) of concentrated nitric acid was added portionwise over a period of about 0.75 hour to a slurry of 5 grams (0.03 mole) of 2,3-dicyanohydroquinone in 60 milliliters (0.73 mole) of concentrated hydrochloric acid and 25 milliliters of acetic acid while the temperature was maintained in the range of from about 32° to about 38° C. After completion of the addition, the temperature was maintained in the same range for about 2.5 hours to obtain the desired 2,3-dichloro-5,6-dicyanobenzoquinone product as a precipitate. The reaction mixture was cooled to about 10° C. to complete the precipitation of the product, the mixture filtered to recover the product and the product washed with carbon tetrachloride and dried. The yield of the product which had a melting point of 210.5°–213° C. was 5.3 grams or 75 percent of theoretical.

Example 7

In a similar manner, 6.6 milliliters (0.1 mole) of concentrated nitric acid was added portionwise over a period of about 15 minutes to a slurry of 5 grams (0.03 mole) of 2,3-dicyanohydroquinone in 35 milliliters (0.42 mole) of concentrated hydrochloric acid and 35 milliliters of water, while the temperature was cooled to and maintained in the range of from about 0° C. to about 2° C. After completion of the addition, the mixture was stirred for about two hours while the temperature was maintained at 0°–2° C. and thereafter warmed to about 30° C. over a period of about one hour and then stirred for about two hours at this temperature. As a result of these operations, a 2,3-dichloro-5,6-dicyanobenzoquinone product was formed which was recovered as previously described. The yield of the product melting from 207° to 210° C. was 5.35 grams or 75.3 percent of theory.

Example 8

An operation was carried out in a manner similar to that above described and using the same amounts of reactants but employing reflux temperature of the reaction mixture as the reaction temperature. 6.6 milliliters (0.1 mole) of concentrated nitric acid was slowly added to the slurry of 2,3-dicyanohydroquinone in aqueous hydrochloric acid while the mixture was refluxing. After completion of the addition, which took about 25 minutes, the mixture was allowed to cool to about 35° C. and thereafter stirred at this temperature for about one hour to obtain a 2,3-dichloro-5,6-dicyanobenzoquinone product. The product which was recovered and purified in a manner previously described melted from 210° to 213° C.

Example 9

A vessel containing 5 grams (0.03 mole) of 2,3-dicyanohydroquinone slurried in 35 milliliters (0.42 mole) of concentrated hydrochloric acid, 35 milliliters of water and 40 milliliters of carbon tetrachloride was swept with oxygen and oxygen passed in above the liquid surface under a pressure of about 4 inches on a xylene manometer. One milliliter (0.016 mole) of concentrated nitric acid was added to the mixture and the resulting mixture stirred at about 25° C. until there was cessation in the uptake of oxygen by the reaction mixture. The process took about 1.5 hours. As a result of these operations, a reaction took place with the formation of the desired 2,3-dichloro-5,6-dicyanobenzoquinone product which was recovered by conventional procedures. The product obtained in a yield of 6.3 grams or 89 percent of theoretical melted from 207° to 211.5° C.

Example 10

A reaction was carried out in a manner similar to that described in Example 9, employing the same amount of reactants except that chloroform was substituted for carbon tetrachloride as extender diluent, to obtain 6.3 grams or 89 percent yield of the desired 2,3-dichloro-5,6-dicyanobenzoquinone product melting from 209° to 213° C.

Example 11

In a manner similar to that described in Example 9 1.4 grams (0.03 mole) nitrogen dioxide-dinitrogen tetroxide mixture is added with stirring to a mixture of 50 grams (0.31 mole) of 2,3-dicyanohydroquinone slurried in 350 milliliters (4.2 moles) of concentrated hydrochloric acid and 350 milliliters of water contained in a vessel fitted with a gas inlet tube, and oxygen passed in above the liquid surface while the mixture is maintained at room temperature. After several hours when the uptake of oxygen has ceased, the mixture is cooled, then filtered, to recover the desired 2,3-dichloro-5,6-dicyanobenzoquinone product having a molecular weight of 227.

Example 12

23.85 pounds (0.265 pound mole) of concentrated nitric acid was added over a 3 hour period with stirring to a mixture of 12.72 pounds (0.0795 pound mole) of 2,3-dicyanohydroquinone, 90.7 pounds (0.89 pound mole) of muriatic acid (22° Baumé) and 128 pounds of methylene dichloride while the mixture was maintained in the temperature range of from about 20° to 32° C. After all the nitric acid had been added, the mixture was refluxed gently for two hours in the temperature range of from about 28° to 35° C. During these operations a reaction took place with the formation of the desired 2,3-dichloro- 5,6-dicyanobenzoquinone product and nitric oxide by-product. The mixture was cooled to 5° C., held at this temperature for about 15 minutes and filtered to recover the yellow 2,3-dichloro-5,6-dicyanobenzoquinone product. The product was washed with 17.5 pounds of a cold mixture of 1:1 muriatic acid-water, then with 21 pounds of cold methylene dichloride and thereafter dried overnight at 60° C. The yield of the product having a melting point of 212°–214° C. was 15.73 pounds or 87.3 percent of theory.

Example 13

6.6 milliliters (0.1 mole) of concentrated nitric acid is added with stirring over a period of about 2 hours to a slurry of 5 grams (0.03 mole) of 2,3-dicyanohydroquinone and 15 grams (0.2 mole) of potassium chloride in 100 milliliters of a 1:1 mixture of concentrated sulfuric acid and water held at about 25° to 30° C. After the completion of the addition of the nitric acid, the mixture is warmed to 50° C. and stirred at this temperature for an additional hour to obtain a 2,3-dichloro-5,6-dicyanobenzoquinone product. The mixture is then cooled to about 10° C. and 300 milliliters of water is added thereto to complete the precipitation of the product. The latter is filtered, washed with 5 percent hydrochloric acid and dried to recover a 2,3-dichloro-5,6-dicyanobenzoquinone product having a molecular weight of 227.

Example 14

21 milliliters of concentrated nitric acid is added with stirring over about a 60 minute period to a suspension of 16 grams (0.1 mole) of 2,3-dicyanohydroquinone in 200 milliliters of a 1:1 mixture of concentrated hydrochloric acid and water warmed to about 50° C. in a closed vessel fitted with an outlet tube. During the heating, a reaction takes place with the formation of a 2,3-dichloro-5,6-dicyanobenzoquinone product which precipitates as a yellow solid and nitric oxide by-product which is a colorless gas insoluble in the reaction mixture and is conducted from the vessel. Stirring is continued while the mixture is maintained in the temperature range of from about 20° to about 30° C. until the cessation of the evolution of nitric oxide gas to complete the reaction. The mixture is then cooled to 5° C. to complete the precipitation of the desired product and the product is recovered by filtration, washed with 5 percent aqueous hydrochloric acid and dried. The molecular weight of the product is 227.

The by-product nitric oxide gas which is conveyed from the reaction is lead to a reactor and brought into contact with air to oxidize the nitric oxide to nitrogen dioxide-dinitrogen tetroxide. The nitrogen dioxide-dinitrogen tetroxide is condensed from the gaseous mixture by passing the gaseous mixture through a condenser maintained below 20° C. to obtain liquid nitrogen dioxide-dinitrogen tetroxide oxidizing agent. The latter is then used in subsequent preparations as described in Example 2.

Example 15

43.5 grams (0.5 mole) of manganese dioxide is added over a one hour period to a suspension of 16 grams (0.10 mole) of 2,3-dicyanohydroquinone in 200 milliliters of a 1:1 mixture of concentrated hydrochloric acid (1.1 moles of HCl) at a reaction temperature of from about 25° to about 50°. After completion of the addition of the oxidizing agent, the resulting mixture is stirred in the temperature range of from about 20° C. to about 35° C. for about one hour. The reaction mixture is cooled to about 5° C. and thereafter filtered to recover the precipitate of a 2,3-dichloro-5,6-dicyanobenzoquinone product having a molecular weight of 227.

Example 16

In a manner similar to Example 15, a reaction is carried out substituting 111.6 grams (0.5 mole) of lead dioxide in place of the manganese dioxide to obtain a precipitate. The precipitate is extracted with benzene and the extract warmed to vaporize off the benzene to recover a 2,3-dichloro-5,6-dicyanobenzoquinone product having a molecular weight of 227.

Example 17

A reaction is carried out according to the procedure of Example 15 except that 47.4 grams (0.30 mole) of potassium permanganate is substituted for the manganese dioxide oxidizing agent to obtain a 2,3-dichloro-5,6-dicyanohydroquinone product having a molecular weight of 227.

Example 18

50 grams (0.31 mole) of 2,3-dicyanohydroquinone is slurried in a mixture of 350 milliliters (4.2 moles) of hydrochloric acid and 350 milliliters of water in a closed vessel. The vessel is swept with oxygen gas and 0.90 gram (0.03 mole, 0.672 liter) of nitric oxide gas is introduced into the vessel. As the reaction proceeds, oxygen gas is continually supplied, on demand, to the closed vessel until oxygen ceases to be taken up. During the uptake of oxygen, the temperature of the reaction mixture is kept at from about 20° C. to about 35° C. After cessation of oxygen uptake, the oxygen is swept out of the vessel with nitrogen and 400 milliliters of methylene dichloride is added and the mixture is brought to gentle reflux and held at reflux for about one hour. The mixture is then cooled to about 5° C., held for about 30 minutes and filtered to obtain a 2,3-dichloro-5,6-dicyanobenzoquinone product having a molecular weight of 227.

Example 19

Oxygen was passed through a vessel containing 5 grams (0.03 mole) of 2,3-dicyanohydroquinone slurried in 35 milliliters (0.42 mole) of concentrated hydrochloric acid and 35 milliliters of water; thereafter, oxygen was passed in above the surface of the reaction mixture under a pressure of about 3 inches in a xylene manometer. One-half milliliter (0.008 mole) of concentrated nitric acid was added to the mixture and the resulting mixture was stirred at about 25° C. to 30° C. until there was cessation in the uptake of oxygen by the reaction mixture. The process took about 2.5 hours. The reaction mixture was stirred for an additional 15 minutes, then 40 milliliters of methylene dichloride and 0.5 milliliter (0.008 mole) of concentrated nitric acid was added to the reaction mixture. The resulting mixture was refluxed gently for two hours, cooled to 2° C. to 5° C. and held in the low temperature range for about 45 minutes. 210 milliliters of ice-cold water was stirred into the mixture and the product was recovered by filtration. The product was washed with 10 milliliters of ice-cold methylene dichloride and dried. There was obtained 6.0 grams (81 percent yield) of 2,3-dichloro-5,6-dicyanobenzoquinone which had a melting point of 213–216° C.

I claim:
1. A process for producing 2,3-dichloro-5,6-dicyanobenzoquinone which comprises mixing together and intimately contacting 2,3-dicyanohydroquinone and an oxidizing agent in the presence of at least 1.5 times the stoichiometric requirement of chloride ion in an aqueous medium having an acid strength of at least 0.5 normal at temperatures of from about 0° to about 100° C., wherein in the foregoing process, the oxidizing agent employed during the course of the reaction is in an amount sufficient to supply at least the stoichiometric requirement thereof and is selected from the group consisting of nitric acid, dinitrogen tetroxide, nitrogen dioxide, manganese dioxide, lead oxide, nitrates, bromates, permanganates, dichromates, nitric oxide-oxygen and nitric oxide-air.

2. A process for producing 2,3-dichloro-5,6-dicyanobenzoquinone which comprises mixing together and intimately contacting 2,3-dicyanohydroquinone and an oxidizing agent in the presence of at least 1.5 times the stoichiometric requirement of chloride ion in an aqueous medium having an acid strength of from about 2 normal to about 12 normal at temperatures of from about 0° to about 100° C., wherein in the forgoing process, the oxidizing agent employed during the course of the reaction is in an amount sufficient to supply at least the stoichiometric requirement thereof and is selected from the group consisting of nitric acid, dinitrogen tetroxide, nitrogen dioxide, manganese dioxide, lead oxide, nitrates, bromates, permanganates, dichlromates, nitric oxide-oxygen and nitric oxide-air.

3. A process for producing 2,3-dichloro-5,6-dicyanobenzoquinone which comprises adding to a closed reaction vessel, a minor amount of nitrogen oxide oxidizing agent to an aqueous acidic slurry of 2,3-dicyanohydroquinone and chloride ion to cause an initial oxidation, thereafter introducing oxygen thereto in amounts sufficient to oxidize the nitric oxide formed as by-product in the initial oxidation reaction occurring therein to nitrogen dioxide-dinitrogen tetroxide oxidizing agent, and continuing the introduction of oxygen until the uptake of oxygen ceases; wherein in the foregoing process the aqueous medium has an acid strength of at least 0.5 normal, the chloride ion is present in at least 1.5 times the stoichiometric requirement, the reaction is carried out in the temperature range of from about 0° C. to about 100° C., and wherein said nitrogen oxide oxidizing agent is selected from the group consisting of nitric acid, nitrogen dioxide, dinitrogen tetroxide, nitrogen dioxide-dinitrogen tetroxide, nitric oxide-oxygen and nitric oxide-air.

4. A process for producing 2,3-dichloro-5,6-dicyanobenzoquinone which comprises adding to a closed reaction vessel, a minor amount of nitric acid oxidizing agent to an aqueous acidic slurry of 2,3-dicyanohydroquinone and chloride ion to cause an initial oxidation, introducing oxygen thereto in amounts sufficient to oxidize the nitric oxide formed as by-product in the initial oxidation reaction occurring therein to nitrogen dioxide-dinitrogen tetroxide oxidizing agent, continuing the introduction of oxygen until the uptake of oxygen ceases, and thereafter adding a minor amount of nitric acid oxidizing agent and an organic diluent and heating to a temperature in the range of from about 30° C. to about 50° C., wherein in the foregoing process the aqueous medium has an acid strength of at least 0.5 normal, the chloride ion is present in at least 1.5 times the stoichoimetric requirement, and wherein said nitrogen oxide oxidizing agent is selected from the group consisting of nitric acid, nitrogen dioxide, dinitrogen tetroxide, nitrogen dioxide-dinitrogen tetroxide, nitric oxide-oxygen, and nitric oxide-air.

5. A process for producing 2,3-dichloro-5,6-dicyanobenzoquinone which comprises adding a nitrogen oxide oxidizing agent selected from the group consisting of nitric acid, nitrogen dioxide, dinitrogen tetroxide, nitrogen dioxide-dinitrogen tetroxide, nitric oxide-oxygen and nitric oxide-air to an aqueous slurry of 2,3-dicyanohydroquinone and a chloride ion wherein the acid strength of the aqueous slurry is at least 0.5 normal and wherein there is present at least 1.5 times the stoichiometric requirement of chloride ion at temperatures of from about 0° C. to about 100° C., wherein the foregoing process, the oxidizing agent employed during the course of the reaction is in an amount sufficient to supply at least the stoichiometric requirement thereof.

6. A process for producing 2,3-dichloro-5,6-dicyanobenzoquinone which comprises adding a nitric acid oxidizing agent to an aqueous acidic slurry of 2,3-dicyanohydroquinone and chloride ion wherein the acid strength of the aqueous slurry is at least 0.5 normal wherein there is present at least 1.5 times the stoichoimetric requirement of chloride ion at temperatures of from about 0° C. to about 100° C., wherein in the foregoing process, the oxidizing agent employed during the course of the reaction is in an amount sufficient to supply at least the stoichiometric requirement thereof.

7. A process for producing 2,3-dichloro-5,6-dicyanobenzoquinone which comprises adding a nitrogen dioxide-dinitrogen tetroxide oxidizing agent to an aqueous acidic slurry of 2,3-dicyanohydroquinone and a chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing process, the oxidizing agent employed during the course of the reaction is in an amount sufficient to supply at least the stoichiometric requirement thereof.

8. A process for producing 2,3-dichloro-5,6-dicyanobenzoquinone which comprises adding a bromate oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing process, the oxidizing agent employed during the course of the reaction is in an amount sufficient to supply at least the stoichiometric requirement thereof.

9. A process for producing 2,3-dichloro-5,6-dicyanobenzoquinone which comprises adding a dichromate oxidizing agent to an aqueous acidic slurry of 2,3-dicyanohydroquinone and chloride ion wherein the acid strength of the aqueous slurry is at least 0.5 normal and wherein there is present at least 1.5 times the requirement of chloride ion at temperatures of from about 0° C. to about 100° C., wherein the foregoing process, the oxidizing agent employed during the course of the reaction is in an amount sufficient to supply at least the stoichiometric requirement thereof.

10. A process for producing 2,3-dichloro-5,6-dicyanobenzoquinone which comprises adding a nitrate oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing process, the oxidizing agent employed during the course of the reaction is in an amount sufficient to supply at least the stoichiometric requirement thereof.

11. A process for producing 2,3-dichloro-5,6-dicyanobenzoquinone which comprises adding a manganese dioxide oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein the foregoing process, the oxidizing agent employed during the course of the reaction is in an amount sufficient to supply at least the stoichiometric requirement thereof.

12. A process for producing 2,3-dichloro-5,6-dicyanobenzoquinone which comprises adding lead dioxide oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° to about 100° C., wherein in the foregoing process, the oxidizing agent employed during the course of the reaction is in an amount sufficient to supply at least the stoichiometric requirement thereof.

13. A process for producing 2,3-dichloro-5,6-dicyanobenzoquinone which comprises adding a permanganate oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing process, the oxidizing agent employed during the course of the reaction is in an amount sufficient to supply at least the stoichiometric requirement thereof.

14. A process for producing 2,3-dichloro-5,6-dicyanobenzoquinone which comprises adding a nitric oxide-oxygen mixture as oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing process, the oxidizing agent employed during the course of the reaction is in an amount sufficient to supply at least the stoichiometric requirement thereof.

15. A process for producing 2,3-dichloro-5,6-dicyanobenzoquinone which comprises adding a nitric oxide-air mixture as oxidizing agent to an aqueous acidic slurry of 2,3-dicyanohydroquinone and chloride ion wherein the acid strength of the aqueous slurry is at least 0.5 normal and wherein there is present at least 1.5 times the stoichiometric requirement of chloride ion at temperatures of from about 0° C. to about 100° C., wherein in the foregoing proces, the oxidizing agent employed during the course of the reaction is in an amount sufficient to supply at least the stoichiometric requirement thereof.

16. A process for producing 2,3-dichloro-5,6-dicyanobenzoquinone which comprises adding in a closed reaction vessel, a minor amount of nitric oxide oxidizing agent to an aqueous, acidic slurry of 2,3-dicyanohydroquinone and chloride ion wherein the acid strength of the aqueous slurry is at least 0.5 normal to cause an initial oxidation, thereafter introducing oxygen thereto in amounts sufficient to oxidize the nitric oxide formed as by-product in the initial oxidation reaction occurring therein to nitrogen dioxide-dinitrogen tetroxide oxidizing agent, and continuing the introduction of the oxygen until the uptake of oxygen ceases, wherein in the foregoing process, the chloride ion is supplied in at least 1.5 times the stoichiometric requirement and the reaction is carried out in the temperature range of from about 0° C. to about 100° C.

17. A process for producing 2,3-dichloro-5,6-dicyanobenzoquinone which comprises adding in a closed reaction vessel, a minor amount of nitrogen dioxide-dinitrogen tetroxide oxidizing agent to an aqueous acidic slurry of 2,3-dicyanohydroquinone and chloride ion wherein the acid strength of the aqueous slurry is at least 0.5 normal to cause an initial oxidation, thereafter introducing oxygen thereto in amounts sufficient to oxidize the nitric oxide formed as by-product in the initial oxidation reaction occurring therein to nitrogen dioxide-dinitrogen tertoxide oxidizing agent, and continuing the introduction of oxygen until the uptake of oxygen ceases, wherein in the foregoing process, the chloride ion is supplied in at least 1.5 times the stoichiometric requirement and the reaction is carried out in the temperature range of from about 0° C. to about 100° C.

18. A process for producing 2,3-dichloro-5,6-dicyanobenzoquinone which comprises adding in a closed reaction vessel, a minor amount of nitric oxide and oxygen mixture to an aqueous acidic slurry of 2,3-dicyanohydroquinone and chloride ion wherein the acid strength of the aqueous slurry is at least 0.5 normal to cause an initial oxidation, thereafter introducing oxygen thereto in amounts sufficient to oxidize the nitric oxide formed as by-product in the initial oxidation reaction to nitrogen dioxide-dinitrogen tetroxide oxidizing agent, and continuing the introduction of oxygen until the uptake of oxygen ceases, wherein in the foregoing process, the chloride ion is supplied in at least 1.5 times the stoichiometric requirement and the reaction is carried out in the temperature range of from about 0° C. to about 100° C.

References Cited

UNITED STATES PATENTS

| 2,748,173 | 5/1956 | Rodgers | 260—623 |
| 2,629,745 | 2/1953 | Gilbert et al. | 260—623 |
| 3,114,756 | 12/1963 | Wilhelm | 260—396 |
| 3,102,124 | 8/1963 | Mitchell | 260—396 |

LORRAINE A. WEINBERGER, *Primary Examiner.*

L. A. THAXTON, *Assistant Examiner.*